United States Patent [19]
Malcangi

[11] Patent Number: 6,114,421
[45] Date of Patent: Sep. 5, 2000

[54] FLAME-RETARDING COMPOSITION FOR POLYMERS, PREPARATION PROCESS AND SELF-EXTINGUISHING POLYMERIC PRODUCTS OBTAINED THEREWITH

[75] Inventor: Alessandro Malcangi, Pedrengo, Italy

[73] Assignee: Domus Industria Chimica S.p.A,, Pedrengo, Italy

[21] Appl. No.: 09/109,843

[22] Filed: Jul. 2, 1998

[30] Foreign Application Priority Data

Jul. 29, 1997 [IT] Italy .................................. MI97A1805

[51] Int. Cl.$^7$ ............................ C08K 5/34; C09K 21/00; C07D 251/00
[52] U.S. Cl. ......................... 524/100; 252/606; 252/609; 544/195; 544/410
[58] Field of Search .............................. 524/100; 544/410, 544/195; 252/606, 609

[56] References Cited

U.S. PATENT DOCUMENTS

| | | | |
|---|---|---|---|
| 3,635,970 | 1/1972 | Fessler et al. | 544/195 |
| 3,810,850 | 5/1974 | Rowton | 524/100 |
| 4,599,375 | 7/1986 | Berte et al. | 524/100 |
| 5,225,464 | 7/1993 | Hill . | |

*Primary Examiner*—Veronica P. Hoke
*Attorney, Agent, or Firm*—Collard & Roe, P.C.

[57] ABSTRACT

Flame-retarding composition for polymers, copolymers and mixed polymers comprising piperazine diacid pyrophosphate, piperazine acid phosphate, melamine acid phosphate, melamine and possibly though not necessarily, an alkaline phosphate. Process for the preparation of said flame-retarding composition, consisting in reacting a mixture comprising phosphoric anhydride, piperazine and melamine with water in controlled conditions, either with mass reaction or suspension reaction with a suitable solvent/dispersing agent.

11 Claims, No Drawings

FLAME-RETARDING COMPOSITION FOR POLYMERS, PREPARATION PROCESS AND SELF-EXTINGUISHING POLYMERIC PRODUCTS OBTAINED THEREWITH

BACKGROUND OF THE INVENTION

1. Field of the Invention

The present invention relates to a flame-retarding composition for polymers, copolymers and mixtures thereof, such as polyolefins, polyamides, etc., as well as epoxy resins, polyester resins, and the like. The invention also relates to a process for the preparation of said composition, as well as the polymers, copolymers, mixtures thereof, thermoplastic and thermosetting resins, and various polymeric materials such as paints, fabrics and the like, which are rendered self-extinguishing by means of said flame-retarding composition.

2. The Prior Art

As is known, a polymeric material is generally caused to become "self-extinguishing" or "anti-flame" or "flame-resistant" by the addition of particular "anti-flame" or "flame-retarding" agents, that can just impart the polymer substance the self-extinguishing characteristics required. Such anti-flame agents are constituted by organic halogenated, usually brominated substances, metal compounds (in particular oxides, such as for instance antimony trioxide), phosphorus and derivatives thereof (such as for instance red phosphorus, ammonium polyphosphate, organic phosphoric esters), various nitrogen-containing compounds (such as for instance urea, dicyandiamide, melamine), and still other ones. As is known, in some cases, in order to achieve the desired self-extinguishing characteristics in a polymer, there are also used two or more different anti-flame products associated with one another, both to exploit in combination anti-flame characteristics and/or "functions" that are specific of the individual products, and to realise given "synergistic" or "combined" effects, and also to avoid adding too high amounts of an individual anti-flame agent, which though being necessary to achieve the desired self-extinguishing level of the polymer would involve an alteration or degradation of said polymer, due to the very characteristics of the anti-flame agent used.

The formulations of polymer articles having self-extinguishing and intumescent characteristics comprise the polymer and at least two basic additives: a phosphorus-containing one, and a nitrogen- and/or nitrogen/carbon-containing one.

A typical example is ammonium polyphosphate which, utilised in the right concentration, imparts the polymer composition class U L 94 VO self-extinguishing characteristics.

Other compounds that can impart self-extinguishing characteristics are piperazine phosphates (U.S. Pat. No. 3,810, 850).

However, the aforementioned compounds prove poorly suitable for use if they are utilised in high-temperature processes or for long periods (polyolefins are a typical example).

The compounds described in EP 84105667.4, useful for use at high temperatures, namely piperazine diacid pyrophosphate, overcomes the aforesaid limits, being provided with high thermal stability and also with good self-extinguishing and intumescent properties.

The effectiveness of the product as concerns the self-extinguishing capacity is markedly improved by the addition of synergistic components containing nitrogen and/or phosphorus (melamine, melamine phosphates and pyrophosphates, ammonium polyphosphate, products of ethylenurea and formaldehyde condensation) and minor additives (silica, silicic acid, and titanium dioxide). The so formulated preparations perform well as concerns self-extinguishing capacity (UL 94; total combustion time; oxygen index).

However, the same patent reports that the conversion yields as concerns the production of the additive are very low (53%).

It is also known that with the anti-flame compositions of the known art there can often take place losses due to extraction and/or solubilisation of the anti-flame agents incorporated in the polymeric materials, with ensuing loss of the flame-retarding power, efflorescences on the material, etc.

SUMMARY OF THE INVENTION

Object of the invention is to realize and provide an anti-flame or flame-retarding composition for polymeric substances, suitable to impart the self-extinguishing polymer obtained excellent characteristics of self-extinguishing and intumescence, and ensuring also to the same polymer excellent characteristics of thermal stability and water resistance.

A further object of the invention is to provide a flame-retarding composition for polymeric substances comprising several active anti-flame constituents associated into a single component or product perfectly homogeneous and such as to ensure a high use effectiveness.

Still a further object of the invention is to provide a process for the preparation of said flame-retarding composition for polymeric materials suitable to ensure a perfect homogeneity to said composition.

Still a further object of the invention is to provide a process allowing to obtain said flame-retarding composition substantially free from degradation substances and/or undesired by-products and with very high yields, substantially of 100%.

These and still other objects and related advantages which shall be more apparent from the following description are achieved by a flame-retarding or anti-flame composition for polymers, copolymers, mixed polymers and mixtures thereof, which composition according to the present invention comprises piperazine diacid pyrophosphate, piperazine acid phosphate, melamine acid phosphate and melamine.

More particularly, said flame-retarding composition comprises:

| | |
|---|---|
| Piperazine diacid pyrophosphate | 45 to 65% by weight |
| Piperazine acid phosphate | 2.5 to 4% by weight |
| Melamine acid phosphate | 5 to 10% by weight |
| Melamine | 15 to 30% by weight |

The composition according to the invention may also comprise one or more alkaline phosphates and/or pyrophosphates, in an amount of 5 to 15% by weight based on the total weight of the composition.

The flame-retarding composition according to the present invention is advantageously used in particular to render polyolefins, polyamides, epoxy resins, polyester resins, polystyrene, acrylic, acrylic/styrenic polymers and the like self-extinguishing.

The flame-retarding composition according to the present invention is substantially pure, more particularly it is free from products deriving from the alteration and/or polymerisation of the various constituents and/or the raw materials used for the preparation of said composition. Besides, the composition is perfectly and intimately homogeneous.

There was observed that, differently from the chemical compounds utilised at present such as: ammonium polyphosphate, melamine phosphates, piperazine neutral and acid phosphates and pyrophosphates, ethylene-urea formaldehyde polycondensates, each of which is effective only when mixed with other ones, the composition according to the invention is used as a single component to be added to the above polymeric substances to render them self-extinguishing. There was also observed that the composition according to the invention exercises its anti-flame activity without giving rise to substantial alterations of the chemical-physical and/or mechanical characteristics of the polymer wherein it is incorporated, and without causing solubilisation, migration, extraction or like phenomena. Therefore, surprisingly, the other conditions being equal, the composition according to the present invention allows to reach the desired levels of self-extinguishing of the polymers wherein it is incorporated, without needing to have recourse to the association with other products, such as for instance urea, dicyandiamide, melamine and/or salts thereof, such as for instance cyanurated melamine, whose use, as is known, involves remarkable and severe drawbacks because of the chemical, physical and mechanical characteristics of the self-extinguishing-rendered polymeric material.

Besides, and still more surprisingly, it was observed that the flame-retarding composition according to the present invention is of general use and may be advantageously employed for polymers, copolymers and polyolefinic mixed polymers (such as polyethylene, polypropylene, ethylene-propylene rubbers, etc.), for styrenic polymers (such as polystyrene, shockproof polystyrene, ABS, SBS resins, and the like), for polyurethanes, thermosetting resins such as unsaturated epoxy and polyester resins. The composition according to the present invention may also be used to render various polymer-based materials self-extinguishing, such as for instance paints, fabrics, carpet sizes, glues, latices and the like.

The amount of flame-retarding composition according to the present invention to be incorporated in the polymer or the polymeric material to render it effectively self-extinguishing changes according to the polymer and is determined experimentally each time. In general, to achieve a satisfactory self-extinguishing level, an amount of composition of 10 to 45% by weight based on the weight of the self-extinguishing-rendered polymer is incorporated in the polymer or polymeric material. For instance, in the case of olefinic polymers and copolymers and the polyamide polymers, the incorporated composition amount is 15 to 35% by weight based on the weight of the self-extinguishing-rendered polymer.

The composition added in the amount of 20–45 parts per every 100 parts of polypropylene generates an intumescent article having excellent self-extinguishing properties.

The flame-retarding composition according to the present invention allows the simultaneous use in the self-extinguishing-rendered polymer of stabilising-antioxidant agents of a known type, lubricants, dyes, inorganic fillers, mineral fibres and the like.

The constituents of the anti-flame composition according to the present invention are incorporated in the polymers according to known techniques, that vary each time according to the polymer.

For instance, in case of a polyolefinic polymer, the incorporation may take place by blending-melting at the plastic state in screw extruders.

Besides, according to the invention, in order to facilitate the dosage (absence of powders) and the dispersion of the flame-retarding composition in the polymeric materials to be rendered self-extinguishing, the same composition may be compounded and granulated with an amount of 10–30% of a wax or a polymeric substance compatible with the polymer wherein it has to be incorporated, with functions of binding-vehiculating means of the flame-retarding composition, as well as with other possible conventional additives, such as adjuvants, dyes, lubricants, antistatic agents, inorganic fillers, and the like.

In this way a "concentrated/vehiculated" batch (known as "master-batch") of the aforesaid flame-retardant, ready to be added to the polymers, is formed.

The process for the preparation of the aforesaid flame-retarding composition for polymers, copolymers, mixed polymers and mixtures thereof comprising piperazine diacid pyrophosphate, piperazine acid phosphate, melamine acid phosphate, melamine and possibly alkaline phosphates and/or pyrophosphates, according to the present invention, consists in reacting with water a mixture comprising phosphoric anhydride, piperazine and melamine intimately mixed with each other in the desired stoichiometric amounts and in suitably controlled time and temperature conditions.

More particularly, in order to suitably control the reaction time and temperature, said water is added to the mixture comprising phosphoric anhydride, piperazine and melamine in form of crystallisation water of a suitable hydrated salt, such as for instance dodecahydrated sodium phosphate.

In this way, water feeding takes place in strictly controlled conditions and the danger is prevented of local overheating that might lead to the formation of melamine and/or piperazine degradation products, such as for instance polymeric substances or the like, which would be harmful or in any case which might affect the self-extinguishing-rendered polymer adversely.

The so obtained flame-retarding composition shows a perfect homogeneity and an ensuing constant chemical composition extended to the whole mass. The reaction temperature is preferably kept between about 50 and 100° C., in particular, in the starting stage, at 60–70° C.

The conversion yields are very high, up to and over 99%, which causes the process to be very convenient from an economic point of view, and also ensures that the obtained composition is substantially free from degradation products and by-products.

The process as described hereinabove is mass-realised in suitable reactors/mixers provided with stirring devices and means suitable to ensure the thermal exchange and the maintenance of the reaction conditions.

According to another embodiment of the present invention, the reaction water is added in the form of a mixture with a suitable solvent/dispersant, which is thereafter separated from the composition and recovered at the end of the reaction by known filtration, distillation and like processes.

According to such embodiment, said solvent/dispersant liquid medium has a function of solvent for one or more of the reacting species, of dispersant for the reaction mass, of thinner, and allows therefore to control the reaction progress by suitably adjusting the water/solvent medium ratio, besides subtracting excess heat during the reaction, exploiting also the evaporation heat of the same solvent.

In this case the process is suspension-realised, using suitable reactors/mixers provided with stirring devices and means suitable to ensure the thermal exchange as well as the condensation and recycling of the solvent/dispersant medium evaporated during the reaction.

Said solvent/dispersant medium is advantageously selected from among dioxane, tetrahydrofuran, dimethyl sulfoxide, diethers and the like.

Also according to this embodiments, the process yields are very high, up to and over 99%.

The invention will be stressed and described by the following examples of practical actuation, solely reported by way of non limiting indication of the protection scope of the invention.

DETAILED DESCRIPTION OF PREFERRED EMBODIMENTS

EXAMPLE 1

Mass Process

A 5 litre stainless steel reactor provided with a heating/cooling jacket, stirred by blades rotary on a horizontal axis (solids mixer) was fed the following raw materials at room temperature:

| | |
|---|---|
| melamine | 300 g |
| piperazine | 200 g |
| phosphoric anhydride | 340 g |

Stirring is started and, under constant cooling, 160 g dodecahydrated trisodium phosphate is fed in a period of time of 5–8 hours, keeping the temperature of the reacting mass under 60° C. Once feeding has finished, the mass is heated to 100° C. for one hour, to allow the completion of the reaction. The so obtained product is cooled to a temperature of 30–40° C. and then discharged. The subsequent milling imparts the product the particle size desired (<100 μm).

EXAMPLE 2

Suspension Process

A 5 litre stainless steel reactor provided with a heating/cooling jacket, stirred by vertical axis impellers was fed the following raw materials:

| | |
|---|---|
| tetrahydrofuran | 700 g |
| melamine | 300 g |
| piperazine | 200 g |
| phosphoric anhydride | 340 g |
| anhydrous trisodium phosphate | 70 g |

The mass is stirred and, under constant cooling, a solution is fed comprising 90 g water and 300 g tetrahydrofuran in a period of time of 2–4 hours, keeping the temperature under 60° C.

Once the reaction has ended, the mass is transferred to a drying chamber in order to evaporate the dispersant (solvent). The so obtained product undergoes a subsequent milling or screening to obtain the particle size desired (<100 μm).

Should the drying chamber be provided with an effective stirring system, the whole process could take place therein.

What is claimed is:

1. A process for the preparation of a flame-retarding composition comprising piperazine diacid pyrophosphate, piperazine acid phosphate, melamine acid phosphate, melamine and possibly alkaline phosphates and/or pyrophosphates, comprising reacting with water a mixture comprising phosphoric anhydride 40% by weight, piperazine 25% by weight and melamine 35% by weight intimately mixed with each other, the water being in an amount of 10% by weight in respect of the total weight of said mixture at a reaction temperature between 50° C. to 100° C. and for a reaction time selected from the group consisting of 2 to 4 hours and 5 to 8 hours.

2. The process according to claim 1, comprising adding water to the mixture comprising phosphoric anhydride, piperazine and melamine in the form of crystallization water of a hydrated salt.

3. The process according to claim 2, wherein said hydrated salt is dodecahydrated sodium phosphate in the amount of 18% by weight in respect of the total weight of said mixture.

4. The process according to claim 1, wherein during the reacting the temperature is kept below 80° C.

5. The process according to claim 1, wherein said reaction water is added in form of a mixture with a suitable solvent/dispersing medium; and afterwards separating said medium from the composition and recovering said medium at end of the reacting by filtration, or distillation.

6. The process according to claim 5, wherein said solvent/dispersing medium is selected from the group consisting of dioxane, tetrahydrofuran, dimethylsulphoxide, and diethers.

7. A flame-retarding composition produced by the process of claim 1, and comprising:

45% to 65% by weight of piperazine diacid pyrophosphate;

2.5% to 4% by weight of piperazine acid phosphate;

5% to 10% by weight of melamine acid phosphate; and

15% to 30% by weight of melamine, with each percent by weight based upon the total composition weight.

8. The flame-retarding composition according to claim 7, further comprising at least one alkaline substance selected from the group consisting of alkaline phosphate, alkaline pyrophosphate, and mixtures thereof, in an amount of 5% to 15% by weight based on the total weight of the composition.

9. A self-extinguishing composition comprising the composition according to claim 7, incorporated into a polymer selected from the group consisting of a polyolefin, a polyamide, an epoxy resin, a polyester resin, polystyrene, an acrylic polymer, and an acrylic/styrene co-polymer.

10. The self-extinguishing composition of claim 9, wherein said composition is incorporated in said polymer in an amount of 10% to 45% by weight based on the weight of the self-extinguishing-rendered polymer.

11. The self-extinguishing composition comprising the composition according to claim 7, incorporated into a polymer selected from the group consisting of an olefinic polymer, an olefinic copolymer, and a polyamide polymer in an amount of 15% to 35% by weight based on the weight of the self-extinguishing-rendered polymer.

* * * * *